(12) United States Patent
Kalkanoglu et al.

(10) Patent No.: US 7,118,794 B2
(45) Date of Patent: *Oct. 10, 2006

(54) SHINGLE WITH IMPROVED BLOW-OFF RESISTANCE

(75) Inventors: Husnu M. Kalkanoglu, Swarthmore, PA (US); Robert L. Jenkins, Honey Brook, PA (US); Stephen A. Koch, Collegeville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 34 days.

This patent is subject to a terminal disclaimer.

(21) Appl. No.: 10/871,911

(22) Filed: Jun. 18, 2004

(65) Prior Publication Data

US 2004/0221536 A1   Nov. 11, 2004

Related U.S. Application Data

(63) Continuation of application No. 10/288,747, filed on Nov. 6, 2002, now Pat. No. 6,758,019.

(51) Int. Cl.
E04D 1/22 (2006.01)
E04D 1/28 (2006.01)

(52) U.S. Cl. ............... 428/143; 428/323; 52/518; 52/555; 52/557; 52/559

(58) Field of Classification Search ............... 52/518, 52/520, 543, 546, 544, 547, 559; 427/143, 427/187
See application file for complete search history.

(56) References Cited

U.S. PATENT DOCUMENTS

| | | | |
|---|---|---|---|
| 2,113,644 A | 4/1938 | Bollaert | |
| 2,863,405 A | 12/1958 | Leibrook et al. | |
| 3,252,257 A * | 5/1966 | Price et al. | 52/518 |
| 3,762,975 A | 10/1973 | Iwasaki et al. | |
| 3,894,376 A | 7/1975 | Shearer | |
| 4,039,706 A | 8/1977 | Tajima et al. | |
| 4,250,221 A | 2/1981 | Pfeffer | |
| 4,333,279 A | 6/1982 | Corbin et al. | |
| 4,352,837 A | 10/1982 | Kopenhaver | |
| 4,472,243 A | 9/1984 | Bondoc et al. | |
| 4,610,902 A | 9/1986 | Eastman et al. | |
| 4,636,414 A | 1/1987 | Tajima et al. | |
| 5,195,290 A * | 3/1993 | Hulett | 52/518 |
| 5,239,802 A | 8/1993 | Robinson | |
| 5,347,785 A | 9/1994 | Terrenzio et al. | |
| 5,571,596 A | 11/1996 | Johnson | |
| 5,577,361 A * | 11/1996 | Grabek, Jr. | 52/543 |
| 5,666,776 A * | 9/1997 | Weaver et al. | 52/557 |
| 5,822,943 A * | 10/1998 | Frankoski et al. | 52/518 |
| 5,950,387 A | 9/1999 | Stahl et al. | |
| 6,092,345 A | 7/2000 | Kalkanoglu et al. | |
| 6,145,265 A | 11/2000 | Malarkey et al. | |
| 6,228,785 B1 | 5/2001 | Miller et al. | |
| 6,247,289 B1 | 6/2001 | Karpinia | |
| 6,341,462 B1 | 1/2002 | Kiik et al. | |
| 6,397,556 B1 * | 6/2002 | Karpinia | 52/748.1 |

(Continued)

*Primary Examiner*—Robert Canfield
(74) *Attorney, Agent, or Firm*—Paul & Paul

(57) ABSTRACT

A wind-resistant shingle and a method of making it is provided in which the rear surface of the shingle is provided with an attached reinforcement layer, which resists upwardly wind-applied bending torque when the shingle is installed on a roof, such that the failure of the shingle when it is bent beyond its elastic limit, is resisted until the shingle has absorbed a high percentage of applied torque.

12 Claims, 8 Drawing Sheets

U.S. PATENT DOCUMENTS

| | | |
|---|---|---|
| 6,426,309 B1 * | 7/2002 | Miller et al. ................. 442/148 |
| 6,510,664 B1 * | 1/2003 | Kupczyk ..................... 52/528 |
| 6,758,019 B1 * | 7/2004 | Kalkanoglu et al. .......... 52/553 |
| 2002/0110679 A1 | 8/2002 | Miller et al. |
| 2002/0160151 A1 | 10/2002 | Pinault et al. |
| 2005/0204675 A1 * | 9/2005 | Snyder et al. ................ 52/555 |

* cited by examiner

SHINGLE WITH IMPROVED BLOW-OFF RESISTANCE

This is a continuation of prior application Ser. No. 10/288,747 filed Nov. 6, 2002, now U.S. Pat. No. 6,758,019.

BACKGROUND OF THE INVENTION

In the manufacture of shingles, it has been known that when shingles are subjected to strong winds, the winds can engage the lower edges or tab portions of the shingles, and bend them upwardly.

On occasion, under strong winds, the tabs can bend upwardly in amounts sufficient that the inherent, internal resistance to substantial bending and perhaps cracking, can be overcome, in that the mat that is formed internally of the shingle, and the asphaltic material on the surfaces of the shingle, may not be sufficient to withstand certain wind conditions.

Various approaches have been made to resist shingle failure via cracking and the like, not all with substantial success.

For example, strips of adhesive material along lower ends of tabs of shingles have been applied, which, when subjected to hot weather conditions, softens an amount sufficient that such adhesive will adhere to the next-subjacent shingle on a roof, eventually harden and thereafter resist upward deflection of shingle tabs under severe wind conditions. However, such adhesive sometimes dries out, offering reduced adhesion. In other cases, the wind conditions can exist during high temperature conditions when such adhesive located under tabs remains soft, and thus the adhesive does not function in its intended manner.

Other approaches have resorted to thickening the mat and/or asphaltic material, to offer internal resistance to bending, but nonetheless, failures due to wind-related bending of tabs of shingles continue to exist.

SUMMARY OF INVENTION

The present invention is directed toward providing a wind-resistant shingle, wherein a separate, exterior reinforcement layer is provided outside the rear surface of the shingle, with such layer comprising a material that is not coated or covered by any thick layer of asphalt or the like, such that the material that comprise the reinforcement assist in absorbing the torque that is applied to the shingle tabs by upwardly-lifting winds.

Accordingly, it is an object of this invention to provide a novel shingle having a wind-resistant layer on the lower surface of the shingle, that comprises a reinforcing material.

It is a further object of the invention to accomplish the above objects, wherein the reinforcement layer comprises a scrim material that includes lifting-torque absorbing strands.

It is another object of this invention to accomplish the above object, wherein the scrim extends into the tab portion of the shingle.

It is a further object of this invention to accomplish the objects above, wherein the shingle absorbs a high percentage of the lifting torque that is applied to the shingle, under conditions in which the tab edge of the shingle is lifted as much as or more than 45°.

It is a further object of this invention to provide a method of making shingles in accordance with the objects set forth above.

Other objects and advantages of the present invention will be readily understood upon a reading of the following brief descriptions of the drawing figures, detailed descriptions of the preferred embodiments and the appended claims.

BRIEF DESCRIPTIONS OF THE DRAWING FIGURES

DETAILED DESCRIPTIONS OF THE PREFERRED EMBODIMENTS

Figure 1:
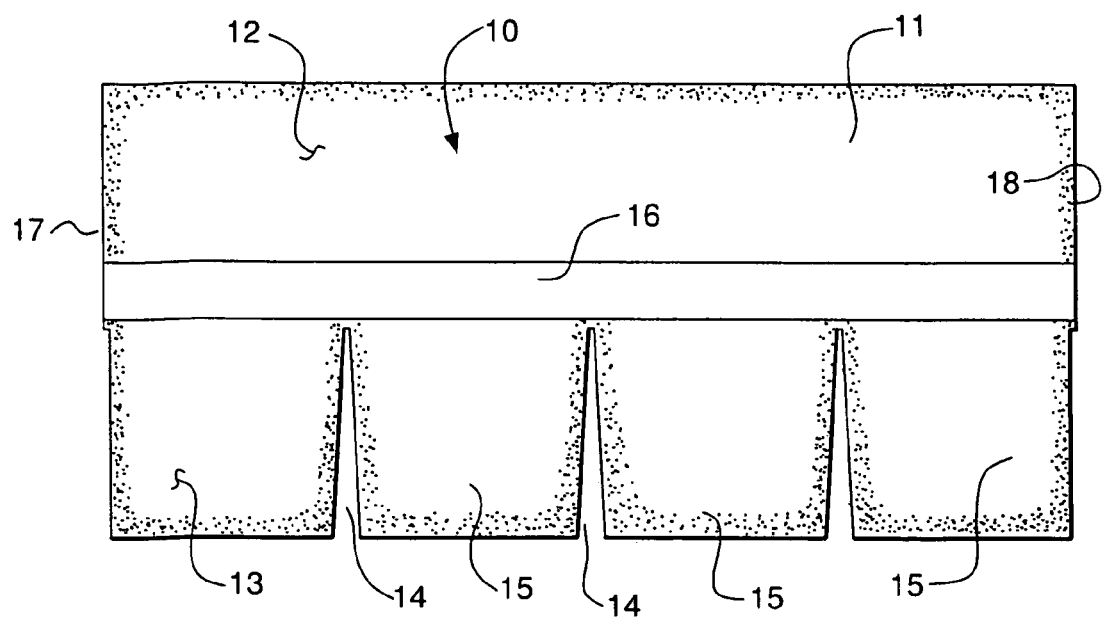
FIG. 1 is a rear elevational view of a shingle made in accordance with the prior art.

Referring now to the drawings in detail, reference is first made to FIG. 1, wherein a prior art shingle is illustrated as comprising a shingle generally designated by the numeral 10, constructed as a mat of preferably fiberglass mesh, having asphalt, or some other form of bitumen material impregnated therein, and forming layers on each surface thereof, with a granular material on each exposed surface. On the upper exposed surface, will be granules of a size desired to resist sun and other weather conditions, and on the opposite, or undersurface 11, there will be preferably smaller granules of a mica or like material, for example. The shingle 10 has a headlap portion 12 and a tab portion 13, having slotted openings 14 dividing the tab portion 13 into a number of discrete tabs 15. On the undersurface 11 there is provided preferably a sheet of release paper or tape 16, which is removed when the shingle is installed on a roof, but which, for stacking shingles for shipment prevents the shingle from sticking to a subjacent shingle in the stack, which subjacent shingle has a similarly located strip of adhesive material, such as more bitumen, extending longitudinally from edge 17 to edge 18, on the front surface of the subjacent shingle.

The basic shingle of FIG. 1 may be made in accordance with the teachings of U.S. Pat. Nos. 6,092,345, 6,145,265, or 5,822,943, the complete disclosures of all of which are herein incorporated by reference.

Figure 2:
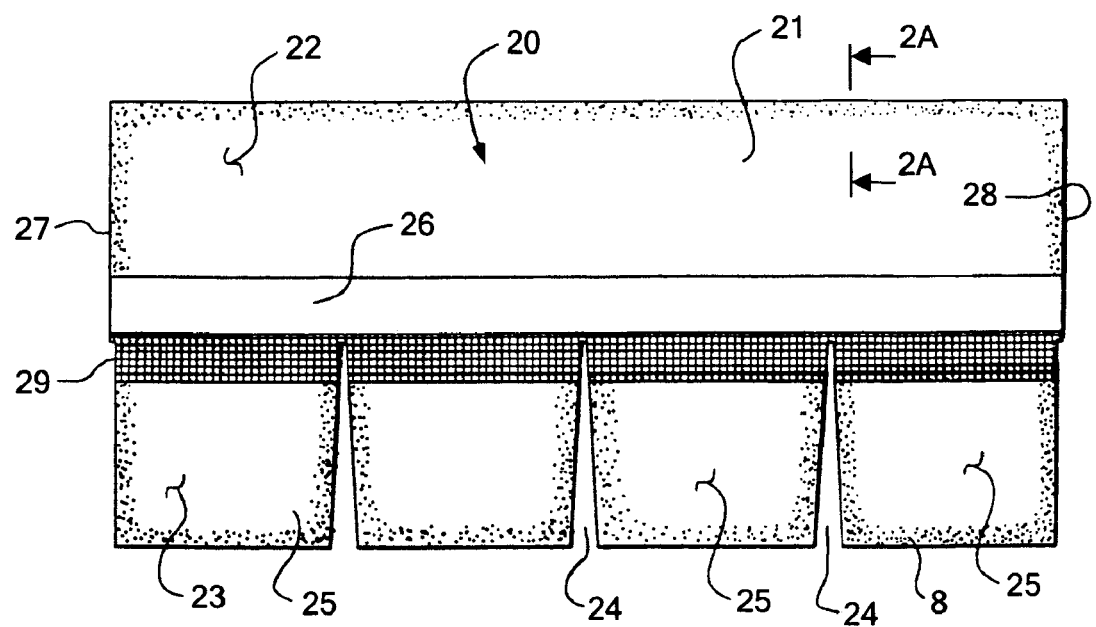
FIG. 2 is an illustration like that of FIG. 1, but wherein the shingle is shown to have a reinforcement layer applied to the rear surface thereof, in accordance with the present invention.

With specific reference to FIG. 2, it will be seen that a shingle 20 is presented, having a rear surface 21, with a release strip 26 running from left to right across the lower end of a headlap portion 22, between edges 27 and 28, and with the tab portion 23 of the shingle 20 comprising a plurality of tabs 25 separated by vertical, spaced apart slots 24.

Figure 2A:
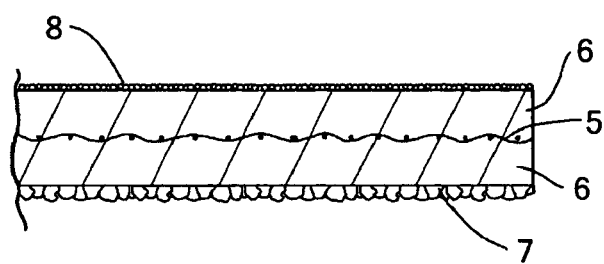
FIG. 2A is a fragmentary sectional view of the shingle of FIG. 2, taken along the line 2A—2A of FIG. 2.

As shown in FIG. 2A, the shingle of FIG. 2 is comprised of a base layer of mat 5, with coatings of asphaltic material 6 on each side thereof, with large granules 7 on the front side, adhered to the asphaltic material 6, and with small granules 8 on the rear side adhered to the asphaltic material 6.

A nailing zone exists on the front surface of the shingle 20, generally located above the release tape or strip 26, running between edges 27, 28 above the slots 24. Essentially, the shingle 20 is similar to that of the shingle 10 of FIG. 1, except that a 2½ inch wide preferably fiberglass reinforcement layer that may comprise a scrim layer 29 is added on the rear 21 of the shingle 20, across the upper end of the tab portion 23, and across the lower end of the headlap portion 22, covering the area shown in FIG. 2, as well as the area disposed beneath the release strip 26, along the lower end of the headlap portion 22 between edges 27 and 28. During the construction of the shingle of FIG. 2, the reinforcement layer 29 is thus applied before the release tape 26 is applied.

The reinforcement layer 29 will probably be a fiberglass scrim and will preferably be a woven construction, involving woven strands disposed at right angles to each other, with a preferred density of, for example nine strands in the vertical direction and nine strands in the horizontal direction per square inch of scrim (9×9 per in$^2$).

Figure 3:
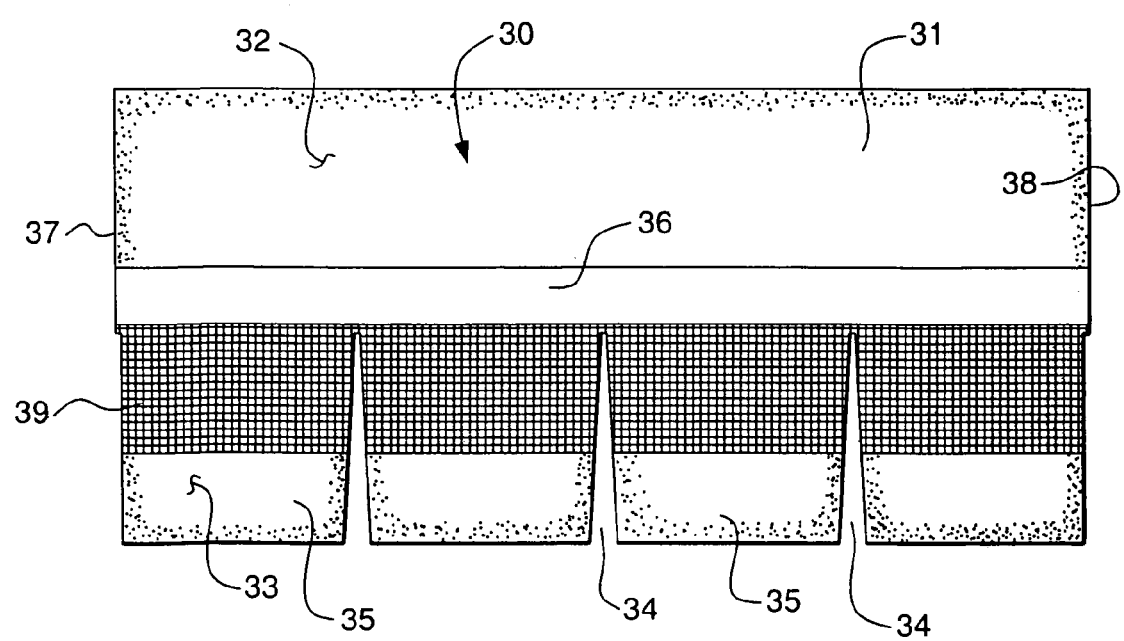
FIG. 3 is an illustration like that of FIG. 2, but wherein the reinforcement layer extends farther into the tab portion of the shingle than in the embodiment of FIG. 2.

With reference to FIG. 3, it will be seen that a shingle 30, much like the shingle 20, is provided, having a rear surface 31, having a headlap portion 32 and tab portion 33, with the tab portion comprising a plurality of tabs 35 separated by slotted openings 34, with a release strip 36 extending between left and right edges 37 and 38, and with a scrim 39 located beneath the release strip 36 as with respect to the embodiment of FIG. 2, but extending downwardly farther into the tabs 35, as shown, in that the scrim 39 is essentially 6 inches wide, running from the upper edge of the release strip 36, into the tabs, as shown.

It will be apparent that other lengths of scrim 29, 39, will be appropriate depending upon the desired resistance to bending under wind conditions, as will be addressed hereinafter.

Figure 4:
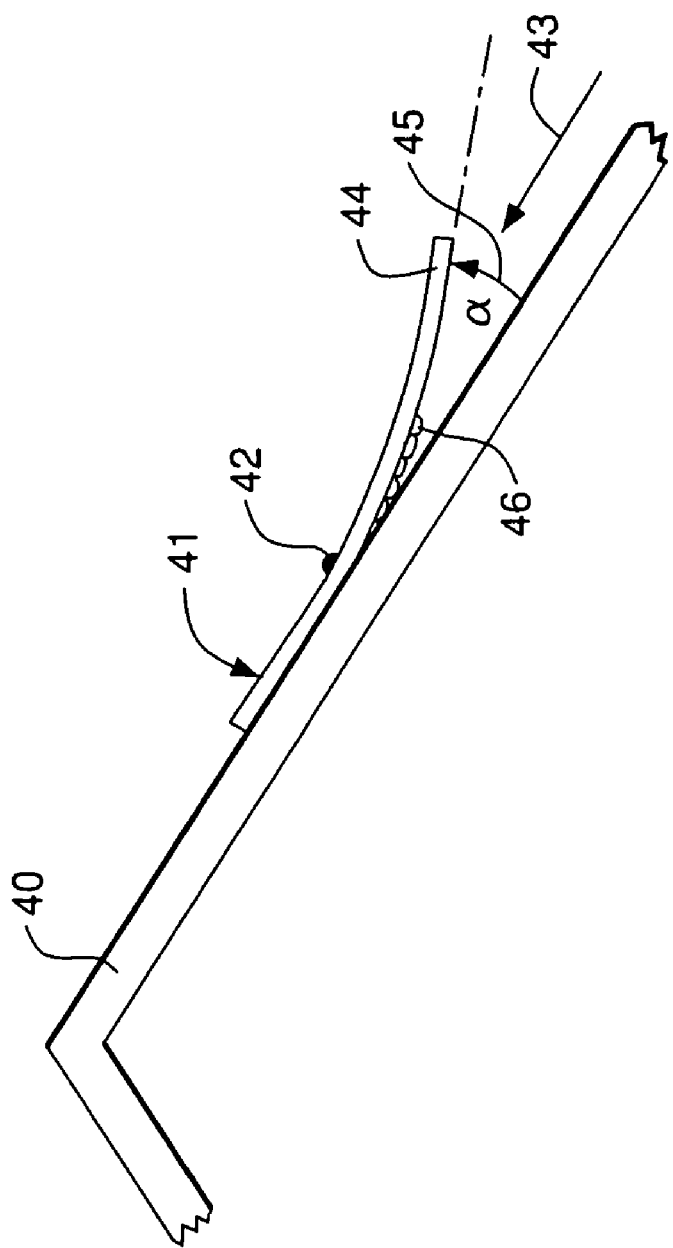
FIG. 4 is a side view of the shingle of this invention shown resisting torque applied to the tab portion of the shingle under a wind-lifting force that bends the shingle upwardly at approximately 45°.

As shown in FIGS. 2, 3 and 4, the scrim layers 29, 39 and 46 each have front and rear surfaces, with the front surfaces adhered to the rear surfaces of the shingle and, will not be coated with a bitumen or other asphaltic material on their rear surfaces, nor will they have granules applied thereto, such that the filaments of the scrim 29, 39, especially those extending vertically as shown in FIGS. 2 and 3, can resist bending and resist failure in the form of the likelihood of forming horizontal cracks across the upper end of the tab portion of the shingle, when the shingle is bent upwardly within its elastic limit under forces applied by winds.

The scrim may have a density other than the 9×9 per in.$^2$ addressed above, such as but not limited to 8×8 per in.$^2$ or 7×7 per in.$^2$, and may be of various compositions other than fiberglass, such as polyester, polypropylene and/or nylon. In lieu of a scrim, the reinforcement layers 29, 39 may comprise thin fabric, plastic film, paper, parchment, foil or the like, either embedded in the asphaltic layer on the rear of the shingle or adhered to the rear of the shingle by an additional post-applied thin layer of asphaltic or non-asphaltic adhesive. The reinforcement layer 29, 39, will be adhered to the rear surface 21, 31 of the shingles of this invention, by means of any suitable adhesive, such as a bitumen or the like, or any other adhesive.

With reference now to FIG. 4, it will be seen that a roof 40 is fragmentally illustrated, having a shingle 41 fastened thereto by means of a nail, staple, 42 or the like. When wind forces occur in the general direction indicated by the arrow 43 in FIG. 4, such that they tend to bend the tab portion 44 of the shingle upwardly to an angle "a", as shown by the dotted arrow 45, the scrim 46 applied to the undersurface of the shingle 41 will tend to resist upward bending of the shingle tab portion 44, largely because of the resistance to such bending that is provided by the reinforcement layer 29, 39 as shown in FIGS. 2 and 3 which will resist stretching and thereby inhibit bending.

It will be understood that up to some level of force applied by wind in the direction 43, the shingle tab portion 44 will bend within its elastic limit in accordance with Hook's law. In this regard, any given weight of shingle, under any particular conditions, will have its own modulus of elasticity, which is a measure of the stiffness or rigidity of the shingle, generally arrived at on an empirical basis, and within which the shingle will return to its original, flat condition when the force of wind is removed.

Reference will now be made to the graphs of FIGS. 5–8, for representative benefits achieved by using a scrim applied to shingles in the manner discussed above, for various weights of shingles having different mats, and under the same temperature conditions, for comparison purposes.

Figure 5:
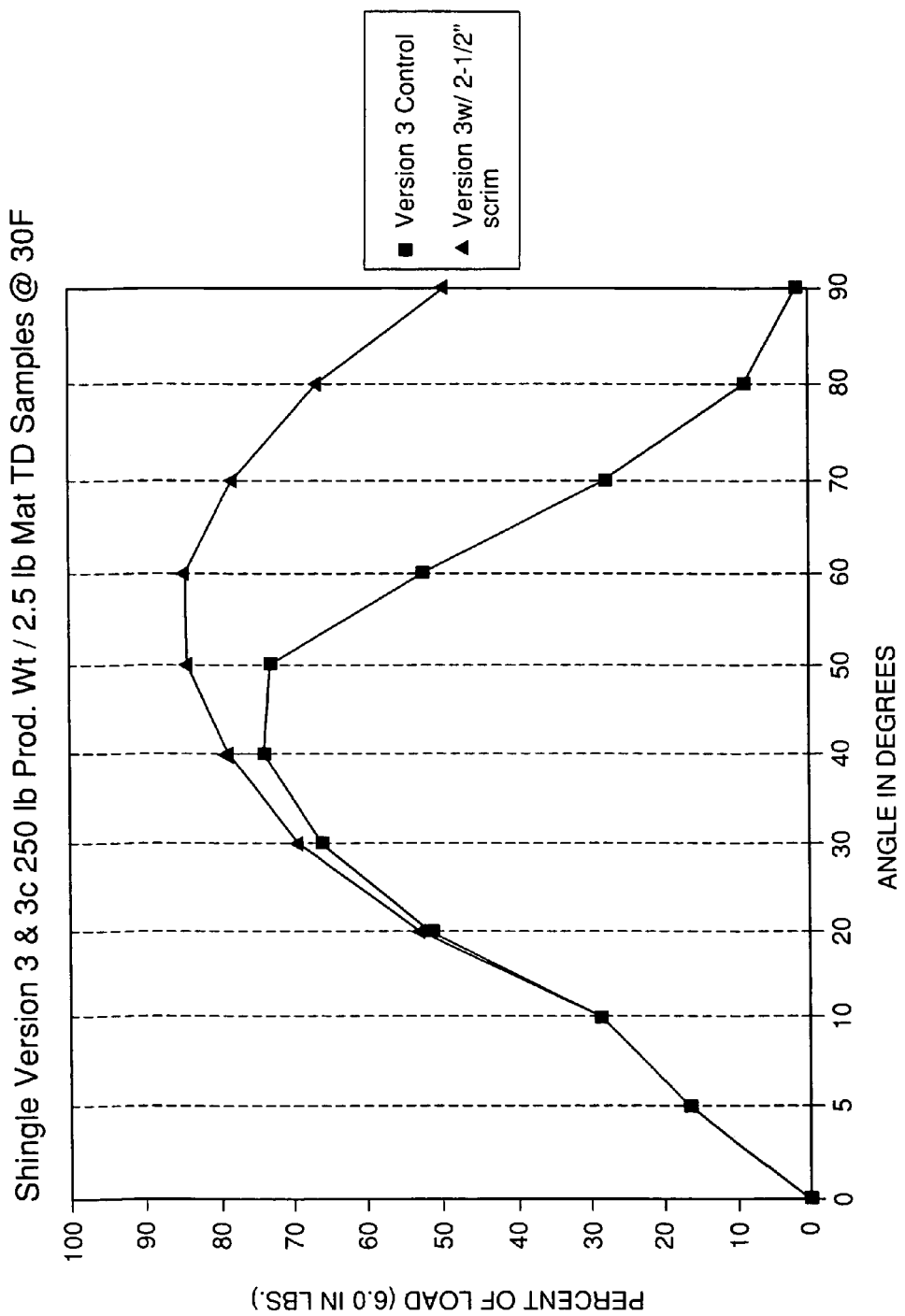
FIG. 5 is a graph showing an example of the absorption of wind-lifting torque upon bending a particular weight of shingle through various angular degrees and the improvement of providing a reinforcement material in accordance with this invention under the same lifting conditions.

With reference to FIG. 5, it will be seen that a shingle version is identified as version 3, with its control identified as version 3C, each being a 250 lb, shingle, in weight per square (1 square equals enough shingles to cover 100 ft$^2$ of roof) and with 2.5 lb. mat. (in weight per 100 square feet of mat). In each case, the samples were tested at 30° F. The ordinate or vertical measure in the graph is the percent of the applied force or load that is absorbed by the shingle at a given degree of angular bend, as shown in degrees on the abscissa or horizontal line of the chart, under a fixed torque applied to the shingle tab portion, of 6.0 inch-lbs. It will be seen that for the control shingle of FIG. 5, failure, or inelastic bending to the point that the shingle does not return to its original, flat condition when the force of wind is removed, occurred at about 40° of angular bend, with failure being defined as a crack or permanent bend as distinguished from a bend within the elastic limit. However, for the shingle having a scrim of 2½ inches in width, as shown in FIG. 2, it will be seen that in FIG. 5 that shingle with the scrim remained within its elastic limit up to about 60° of angular bend, prior to failure. It will thus be seen that the specimen graphed in FIG. 5 having a scrim applied thereto absorbed about 75% of the torque load applied thereto, for a bend of the tab portion of the shingle of about 60°, before failure.

Figure 6:
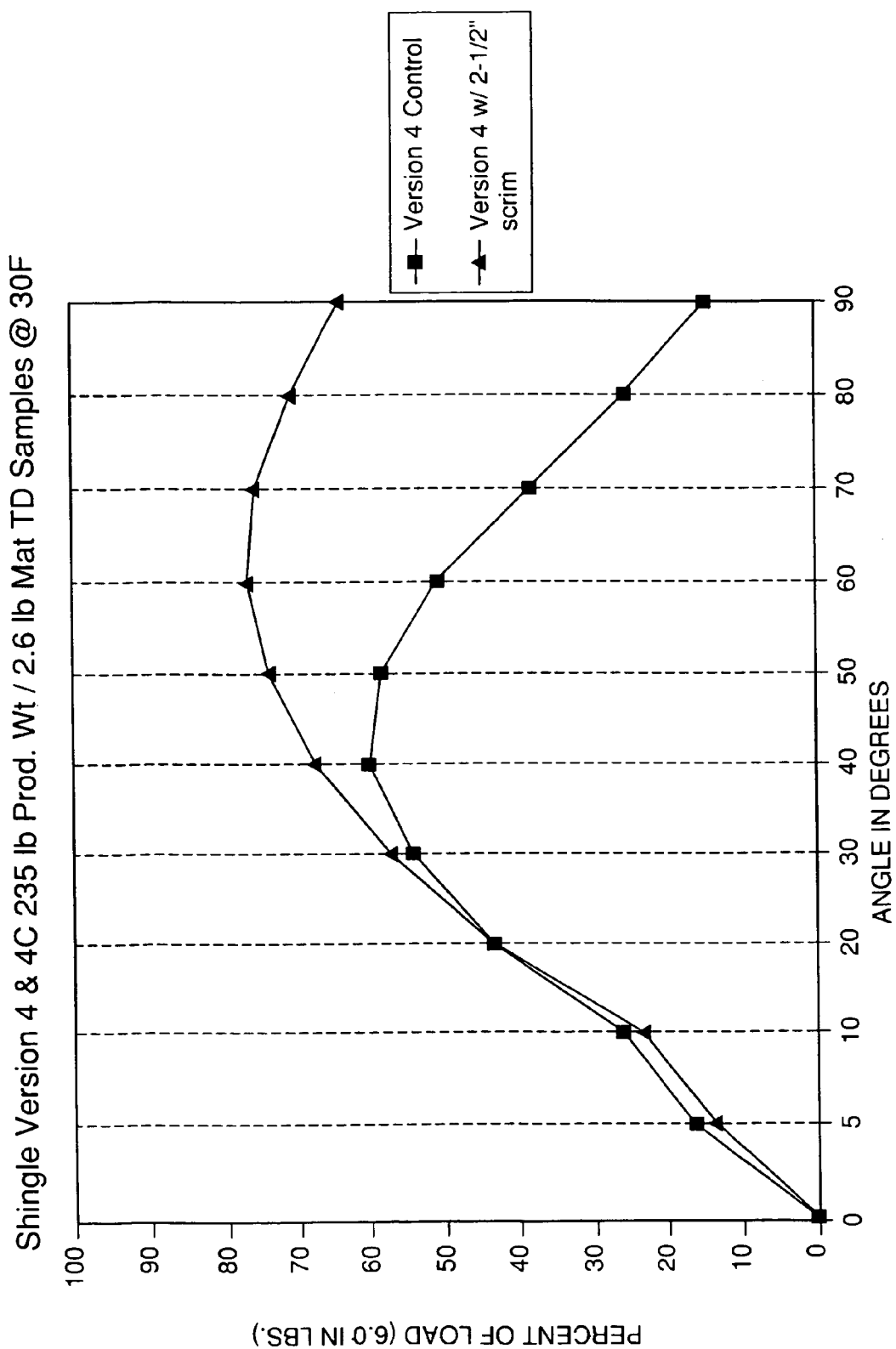
FIG. 6 is a view similar to that of FIG. 5, for a somewhat different weight of shingle, and a different weight of mat for the shingle.

Referring now to FIG. 6, wherein a version 4 was matched against a control version 4C, for a 235 lb. weight of shingle having a 2.6 lb. mat, again at 30°, the control version absorbed about 60% of the torque that was applied, up to about 40° of angular bend, whereas the specimen graphed in FIG. 6 having a 2½ inch wide scrim applied thereto absorbed about 77% of the applied torque load, when subjected to a bend of 60°, before failure.

Figure 7:
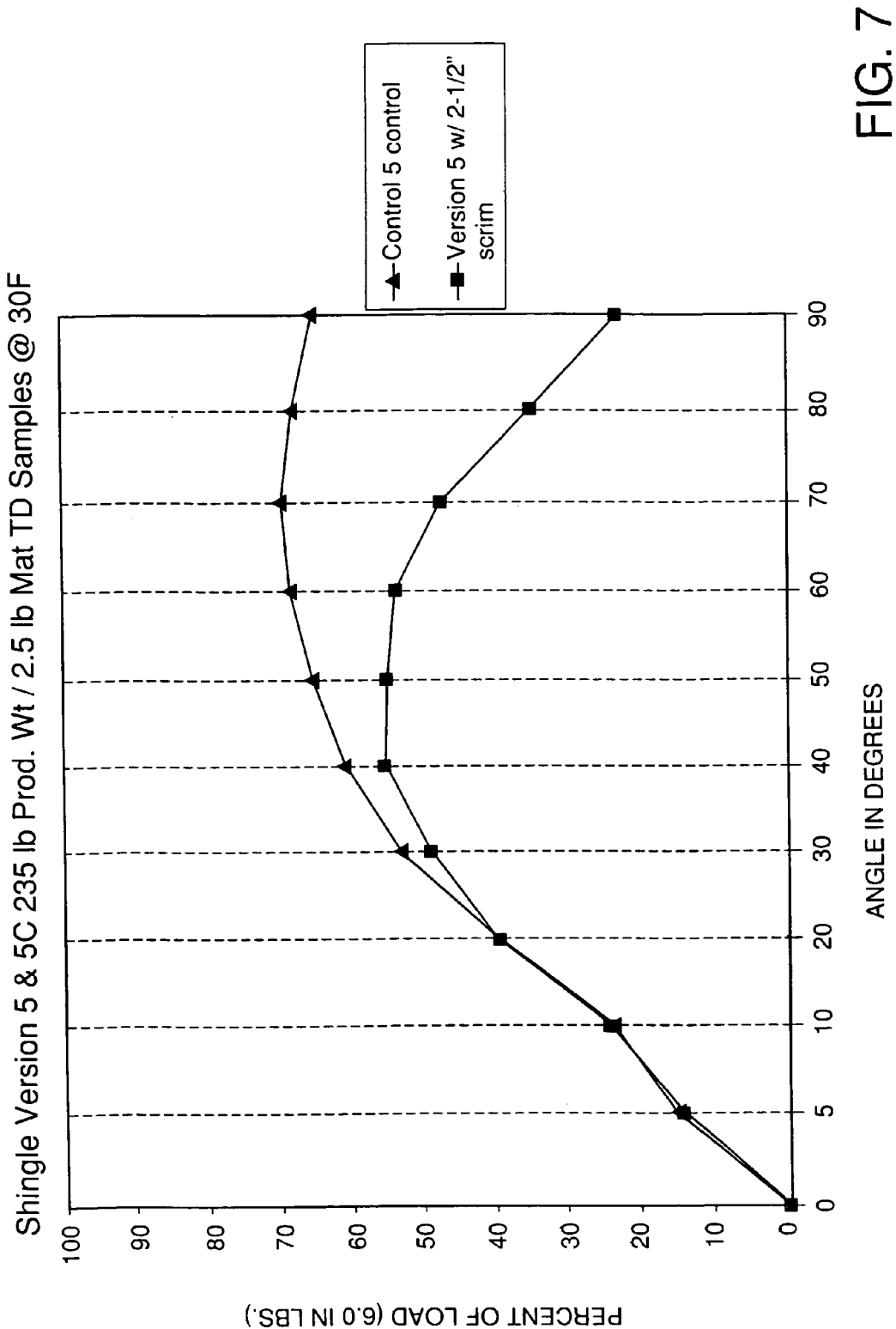
FIG. 7 is an illustration similar to that of FIGS. 5 and 6 for a differently constructed shingle.

Referring now to FIG. 7, wherein yet another shingle 5 was tested against a control shingle 5C, with the shingle graphed in FIG. 7, like that of FIG. 6 also being a 235 lb. weight per stack, but having a 2.5 lb. mat, and likewise having a 2½ inch wide scrim, it will be seen that, whereas the control version absorbed only about 55% of the applied torque at about a 40° bend, the version with the scrim applied thereto absorbed about 70% of the applied load, when bent about 70°. Thus, the effect of a slightly thinner mat was noted for a shingle with scrim applied thereto.

Figure 8:
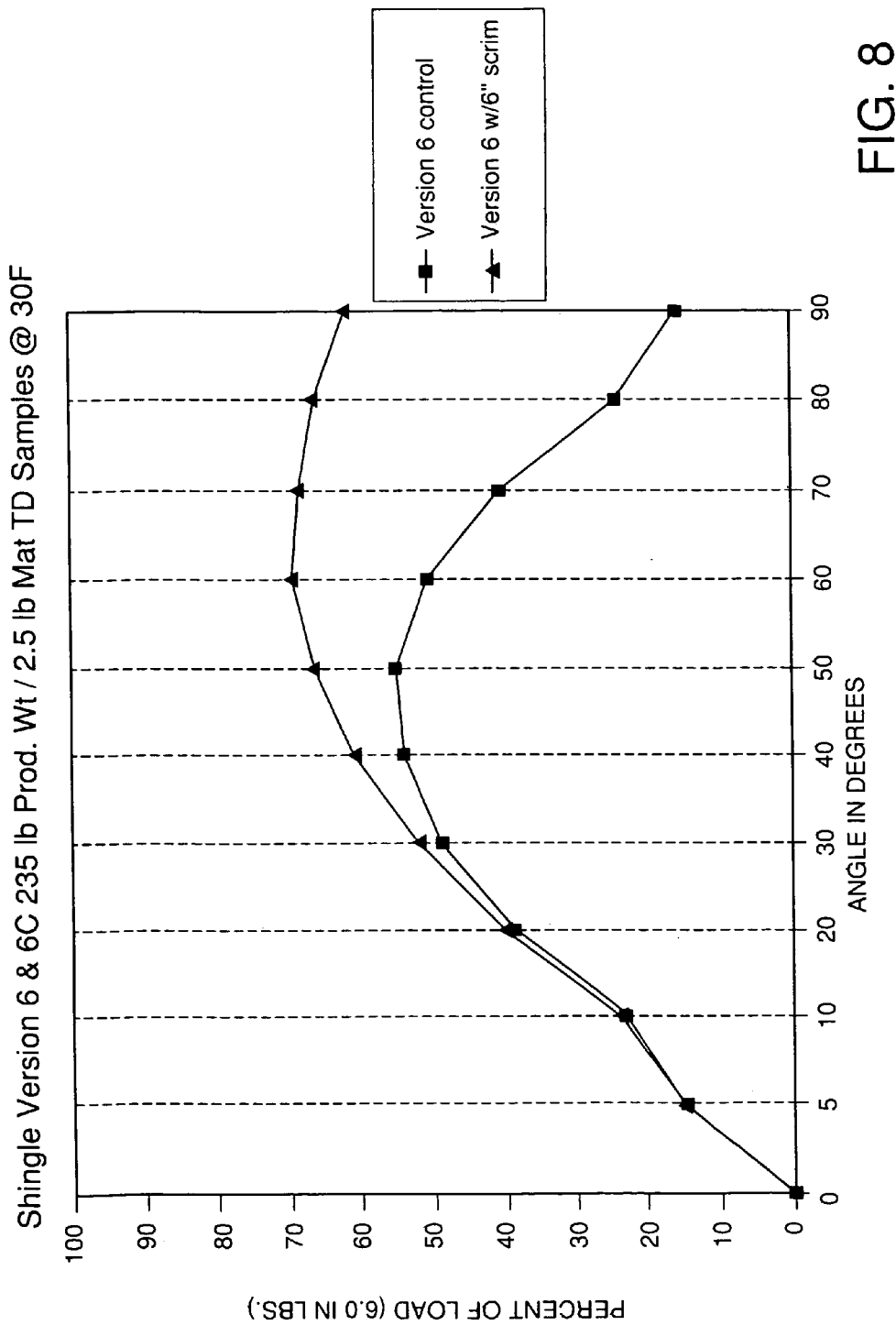
FIG. 8 is a graph similar to that of FIG. 7, for a shingle having a wider reinforcement layer.

With reference now to FIG. 8, it will be seen that shingle versions 6 and control shingles 6C were also shown as comprising a 235 lb. shingle by weight, and a 2½ lb. mat, but wherein, unlike the similar specimen indicated for FIG. 7, the specimen graphed in FIG. 8 had a 6 inch wide scrim applied thereto. It will be seen that the control version of FIG. 8 tested similarly to that of the control version of FIG. 7, and that the version with the 6 inch scrim applied thereto likewise tested similarly to that of the scrim-applied version of FIG. 7.

It will thus be seen that the bending tests, performed with a Tinius-Olsen Flexibility Tester to apply the force bending the shingle tab portions 44 in the direction of the arrow 45 of FIG. 4 all show that the specimens with scrim reinforcement embedded on their rear sides exhibit improved resistance to failure upon bending, and thus are capable of maintaining and carrying applied stress due to bending to much higher degrees than shingle specimens without the scrim. Thus, shingles with the scrim applied thereto in accordance with this invention provide improved resistance to damage due to wind uplift.

It will apparent from the forgoing that various modifications may be made in the details of construction, as well as with the use of shingles of this invention, all within the spirit and scope of the invention as defined in the appended claims.

What is claimed is:

1. A wind-resistant shingle having front and rear surfaces, a width defined by upper and lower edges and a length defined by right and left edges, comprising:
   (a) a base layer of mat having front and rear surfaces;
   (b) a coating of asphaltic material on both front and rear surfaces of the mat presenting corresponding front and rear asphaltic material surfaces;
   (c) coatings of granular material on the asphaltic material on both front and rear surfaces of the asphaltic material;
   (d) a longitudinal fastening zone between right and left shingle edges, generally intermediate said upper and lower edges;
   (e) a generally longitudinal wind-resistant layer having front and rear surfaces, with its front surface adhered to said rear surface of said shingle, and extending at least substantially between right and left edges of the shingle;
   (f) said wind-resistant layer extending at least partially lower than the fastening zone, toward the lower edge of the shingle; and
   (g) said wind-resistant layer comprising a scrim of crossing strands of reinforcing material with the rear surface of the scrim being uncoated with asphaltic material.

2. The shingle of claim 1, wherein the shingle comprises an upper headlap portion and a lower tab portion; with the tab portion comprising a plurality of tabs spaced by slots that extend upward toward the headlap portion from the lower edge; with the fastening zone being generally located above the tab portion.

3. The shingle of claim 1, wherein the width of the scrim is approximately 2½ inches wide.

4. The shingle of claim 1, wherein the width of the scrim is approximately 6 inches wide.

5. The shingle of claim 2, wherein a scrim extends for a width of approximately 1 inch above the upper ends of the slots.

6. The shingle of claim 5, wherein the width of the scrim is approximately 2½ inches wide.

7. The shingle of claim 5, wherein the width of the scrim is approximately 6 inches wide.

8. The shingle of claim 1, wherein the scrim comprises a cross-hatched plurality of strands of at least 9×9 per inch$^2$.

9. The shingle of claim 1, wherein the scrim is of a strand density, thickness and strength such that the shingle absorbs 80% of 6 inch-lbs. of lifting torque at a 50° angle of lift of the lower edge of the shingle relative to the upper end of the shingle, without shingle failure.

10. The shingle of claim 1, wherein the scrim is of a strand density, thickness and strength such that the shingle absorbs 70% of 6 inch-lbs. of lifting torque at a 60° angle of lift of the lower edge of the shingle relative to the upper end of the shingle, without shingle failure.

11. The shingle of claim 1, wherein the scrim is exposed and uncovered on the rear surface of the shingle.

12. The shingle of claim 1, wherein the scrim comprises means for increasing the amount of applied lifting load that the shingle will absorb, under bending conditions, within the elastic limit of the shingle, prior to failure.

* * * * *